United States Patent
Frydman et al.

(10) Patent No.: US 10,945,150 B2
(45) Date of Patent: Mar. 9, 2021

(54) METHODS, CIRCUITS, DEVICES, SYSTEMS AND ASSOCIATED COMPUTER EXECUTABLE CODE FOR OPERATING A WIRELESS COMMUNICATION NETWORK

(71) Applicant: SAGUNA NETWORKS LTD., Yokneam Illit (IL)

(72) Inventors: Daniel Nathan Frydman, Haifa (IL); Lior Fite, Zurit (IL)

(*) Notice: Subject to any disclaimer, the term of this patent is extended or adjusted under 35 U.S.C. 154(b) by 0 days.

(21) Appl. No.: 15/835,189

(22) Filed: Dec. 7, 2017

(65) Prior Publication Data

US 2018/0160330 A1  Jun. 7, 2018

Related U.S. Application Data

(60) Provisional application No. 62/430,942, filed on Dec. 7, 2016.

(51) Int. Cl.

| | |
|---|---|
| *H04W 28/02* | (2009.01) |
| *H04W 64/00* | (2009.01) |
| *H04L 12/26* | (2006.01) |
| *H04W 24/08* | (2009.01) |
| *H04W 24/02* | (2009.01) |
| H04W 72/04 | (2009.01) |

(Continued)

(52) U.S. Cl.
CPC ....... *H04W 28/021* (2013.01); *H04L 43/0882* (2013.01); *H04L 43/10* (2013.01); *H04L 43/16* (2013.01); *H04W 24/02* (2013.01); *H04W 24/08* (2013.01); *H04W 64/006* (2013.01); H04W 24/04 (2013.01); H04W 72/048 (2013.01); H04W 84/18 (2013.01)

(58) Field of Classification Search
CPC ... H04W 28/021; H04W 24/02; H04W 24/08; H04W 64/006; H04W 24/04; H04W 72/048; H04W 84/18; H04L 43/0882; H04L 43/10; H04L 43/16
See application file for complete search history.

(56) References Cited

U.S. PATENT DOCUMENTS

| | | | | |
|---|---|---|---|---|
| 2004/0242272 | A1* | 12/2004 | Aiken | H01Q 1/246 |
| | | | | 455/562.1 |
| 2005/0054349 | A1* | 3/2005 | Balachandran | H04W 60/04 |
| | | | | 455/456.1 |

(Continued)

*Primary Examiner* — Luat Phung (57) ABSTRACT

Disclosed are methods, circuits, devices, systems and associated computer executable code for operating a wireless communication network. According to embodiments of the present invention, one or more network appliances functioning within a Radio Access Network (RAN), at or near an access point, of an exemplary network may identify within a multiplexed downstream communication line leading towards a wireless access point a packet stream addressed to a destination mobile communication device communicatively coupled to the access point and located within a sector or portion of a coverage area of the access point. The same or another appliance may correlate an identifier of the packet stream destination device with an estimated device location within the coverage area along with an associated coverage area sector. By measuring one or more packet stream parameters of the identified packet stream, an estimate of a data service capacity level providable within the specific sector may be estimated and used to adjust network communication resource allocation.

13 Claims, 5 Drawing Sheets

(51) Int. Cl.
*H04W 84/18* (2009.01)
*H04W 24/04* (2009.01)

(56) References Cited

U.S. PATENT DOCUMENTS

| | | | |
|---|---|---|---|
| 2014/0066077 A1* | 3/2014 | Brisebois | H04W 16/08 |
| | | | 455/445 |
| 2014/0128115 A1* | 5/2014 | Siomina | H04L 1/0015 |
| | | | 455/501 |
| 2017/0311217 A1* | 10/2017 | Jung | H04W 16/32 |

* cited by examiner

```
Call Detailed Record
{...
    Service type: Netflix Video
    Quality measurement
    {
        eCGI: XXX
        {
            Specific Location : AAA (optional)

{
                Quality: 90%
            }
            Specific Location : BBB (optional)

{
                Quality: 90%
            }
        }
        eCGI:XXX to eCGI:YYY
            Specific Location : CCC (optional)
            {
                Quality: 60%
            }
        eCGI:YYY
            Specific Location : DDD (optional)
            {
                Quality: 80%
            }
        eCGI:YYY to eCGI:ZZZ
            Specific Location : EEE (optional)
            {
                Quality: 0%
            }
        }
    }
```

METHODS, CIRCUITS, DEVICES, SYSTEMS AND ASSOCIATED COMPUTER EXECUTABLE CODE FOR OPERATING A WIRELESS COMMUNICATION NETWORK

RELATED APPLICATIONS

The present invention claims priority from U.S. Provisional Patent Application No. 62/430,942, filed Dec. 7, 2016. The '942 provisional patent application, along with all of its teachings, is hereby incorporated in this application by reference and in its entirety.

FIELD OF THE INVENTION

Some embodiments relate generally to the fields of communication and content delivery, and more particularly, to methods, circuits, devices, systems and associated computer executable code for operating a wireless communication network.

BACKGROUND

The world has gone wireless. Almost everyone in the developed world, and many in the underdeveloped world, are walking around with mobile communication devices connected to the internet through wireless communication network such as those provided by cellular network operators. These wireless communication networks have become essential infrastructure in our day to day lives, and in some cases, such as telemedicine, lives depend on the networks' proper operation.

Since wireless communication performance is highly susceptible external factors, including: (a) environment, stationary and moving interferences sources; (b) usage congestion levels in different sectors/cells of an access points coverage array; and (c) radio frequency equipment performance deviations due to temperature and other external factors, achievable data capacity or performance tends vary across sectors of a coverage area of a network, and even performance in the same sector may vary at different times of the day, week, month or year. Network operators keen to maintain customer acceptable performance across the network need to monitor data capacity sector by sector. Today, monitoring and analyzing a network's performance quality throughout the network usually requires manual intervention and in many cases data collection itself is carried out by an operator's trained employees driving around the network in dedicated vehicles and collecting quality information.

SUMMARY OF THE INVENTION

The present invention includes methods, circuits, devices, systems and associated computer executable code for operating wireless communication network. Aspects of the present invention include the use of Edge cloud computing within a mobile network. The present invention includes extracting radio information, cell congestion and location of specific devices, and using the information for network performance enhancement by adjusting one or more operational parameter of one or more access points within a RAN of a wireless communication network.

Embodiments of the present invention include methods and systems to enable generating information (CDRs or other), mapping the quality of the networks throughout each cell coverage area and on the borders between cells, in a substantially continual and automated manner.

Embodiments of the present invention may include identifying within a multiplexed downstream communication line leading towards a wireless access point, of the network's RAN, a packet stream addressed to a destination mobile communication device communicatively coupled to the access point and located within a sector or portion of a coverage area of the access point. The invention may include correlating an identifier of the packet stream destination device with an estimated device location within the coverage area. The location may be associated with a coverage area cell or sector. Measurement one or more packet stream parameters may enable derivation or estimates of a data service capacity level providable within the specific sector where the destination mobile communication device is estimated to be located.

According to embodiments, estimating a data service capacity level providable within the specific sector where the destination mobile communication device is estimated to be located may include estimating one or more wireless link parameters of the mobile communication device by measuring one or more packet parameters of the packet stream heading to the mobile communication device. Estimating a data service capacity level providable within the specific sector may include estimating one or more wireless link parameters of another mobile communication device estimated to be in the specific sector by measuring one or more packet parameters of another packet stream heading to the other mobile communication device.

Embodiments of the present invention may include adjusting one or more access point operating parameters responsive to packet stream parameter measurement of the identified packet stream. Adjusting an access point operating parameter may include compensating for a data service capacity level providable within a specific sector estimated to be below a threshold level.

Further embodiments of the present invention may include a wireless communication network including at least one network radio access network (RAN) segment with at least one wireless access points configured to provide a data connectivity service to at least one mobile communication device located within a coverage area of the at least one RAN. a Network Service Capacity Mapper ("NSCM") according to embodiments may estimate data service capacity levels providable by one or more access points of said at least one RAN within different sectors of the coverage area of the at least one RAN. Estimating data service capacity levels providable within a specific sector may include estimating one or more wireless communication link parameters of an active, or recently active, wireless communication link between an access point of said RAN and a mobile communication device whose estimated location is within the specific sector. Estimating one or more communication link parameters of a wireless communication link may include inspecting one or more packet streams transported over the wireless communication link.

The network according to embodiments of the present invention may include be otherwise associated with a Self-Organizing Network (SON) controller configured to receive from the NSCM regular update messages relating to data service capacity levels estimated by said NSCM. The SON may be further configured to adjust one or more RAN operational parameters so as to adjust data service capacity levels in sectors of said RAN coverage area.

According to further embodiments of the present invention, the NSCM may be adapted to concurrently estimate communication link parameters of each of two or more active, or recently active, wireless communication links, each wireless communication link being associated with a different mobile communication device located in the same or in different sectors of the coverage area, and each mobile communication device communicating with either the same or with a different access point of said RAN. Estimating one or more link parameters of an active, or recently active, wireless communication link between an access point and a mobile communication device, in order to estimate a data service capacity level providable to a sector within which the mobile communication device is located, may include identifying within a multiplexed downstream communication line, leading to a transmit (TX) input port of said access point, a multimedia packet stream addressed to the mobile communication device.

According to some embodiments, estimating one or more link parameters of an active, or recently active, wireless communication link between an access point and a mobile communication device, in order to estimate a data service capacity level providable to a sector within which the mobile communication device is located, may include (a) correlating a packet destination device identified within the identified packet stream with an estimated location of the destination device within the coverage area of the RAN; and (b) estimating at least one wireless communication link parameter by measuring at least one parameter of the identified packet stream.

According to some embodiments, NSCM may use one or more measured packet stream parameters of packet streams corresponding to each of one or more active, or recently, wireless communication links for wireless communication devices estimated to be located within a given sector of the coverage area for estimating a data service capacity level providable by said RAN to the given sector. The NSCM estimation of one or more parameters of an active, or recently active, wireless communication link may include measuring a bitrate of a multimedia packet stream transported to the mobile communication device over the wireless communication link. The NSCM estimation of one or more parameters of an active, or recently active, wireless communication link may include measuring a packet parameter of a multimedia packet stream transported to the mobile communication device over the wireless communication link, wherein the measured packet parameter is selected from the group consisting of: (a) uplink bitrate, (b) downlink packet jitter, (c) uplink packet jitter, (d) downlink packet latency, (e) uplink packet latency, and (f) ping packet round trip time.

According to further embodiments, the NSCM may generate a reporting message to said SON controller with estimates of a RAN providable data service capacity levels to one or more sectors either on a fixed schedule, responsive to specific estimate trigger, or based on some combination of a schedule and triggers. The reporting message may include estimates of providable data service capacity levels for each of one or more specific sectors of the coverage area where recent capacity estimates were made, or the reporting message may include the most recent capacity estates for all the sectors within the coverage area.

According to further embodiments, SON controller may be adapted to adjust one or more RAN operational parameters selected from the group of parameters consisting of: (a) reallocated a communication channel for one or more mobile communication devices located in a sector of the RAN coverage area; (b) reassign an access point for each one or more mobile communication devices in a sector of the RAN coverage area; (c) adjust a center frequency of one or more communication channels of an access point; (d) adjust a transmit power level of one or more TX communication channels of an access point; (d) adjust an RX amplifier gain of one or more RX communication channels of an access point; (e) adjust a beam-steering parameter for one or more channels, RX or TX, of an access point.

According to embodiments, a coverage area sector may be estimated to have a data service capacity level below a threshold level due to either passive or active radio frequency interference, and said SON either adjusts center frequencies, power level, gain factor or beamforming parameters associated with one or more communication channels servicing the sector. Passive interference may be introduced by non-radiating elements such as humidity, cars, trucks and buildings, while active interference may be radiating elements such as electrical generators, electric motors, RF communication transmitters and other access points.

According to some embodiments, the said SON may receive a message indicating that a coverage area sector is estimated to have overcapacity relative to the number of mobile communications devices regularly present in that sector, the SON is configured to reallocate underutilized communication resources from servicing the sector with overcapacity towards servicing other sectors needing additional communication resources.

Further embodiments of the present invention may include a network utilization pattern detector integral or otherwise functionally associated with said NSCM, and adapted to recognize cyclical network demand and capacity patterns across cyclical periods such as hours of the day, days of week, weeks of year, months of the year, and holidays. The network utilization pattern detector may also be integral or otherwise functionally associated with the SON, and may be adapted to trigger the SON to predicatively adjust one or more network RAN parameters to correspond and compensate for demand and capacity predications based on previously identified demand and capacity patterns.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a, random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Aspects of the present invention may include a Self-Organizing Network (SON), which is an automation technology designed to make the planning, configuration, management, optimization and healing of mobile radio access networks simpler and faster. SON functionality and behavior has been defined and specified in generally accepted mobile industry recommendations produced by organizations such as 3GPP (3rd Generation Partnership Project) and the NGMN (Next Generation Mobile Networks).

SON has been codified within 3GPP Release 8 and subsequent specifications in a series of standards including 36.902, as well as public white papers outlining use cases from the NGMN. The first technology making use of SON features will be Long Term Evolution (LTE), but the technology has also been retro-fitted to older radio access technologies such as Universal Mobile Telecommunications System (UMTS). The LTE specification inherently supports SON features like Automatic Neighbor Relation (ANR) detection, which is the 3GPP LTE Rel. 8 flagship feature.

Newly added base stations should be self-configured in line with a "plug-and-play" paradigm while all operational base stations will regularly self-optimize parameters and algorithmic behavior in response to observed network performance and radio conditions. Furthermore, self-healing mechanisms can be triggered to temporarily compensate for a detected equipment outage, while awaiting a more permanent solution.

Distributed SON—In this type of SON (D-SON), functions are distributed among the network elements at the edge of the network, typically the ENodeB elements. This implies a certain degree of localization of functionality and is normally supplied by the network equipment vendor manufacturing the radio cell.

Centralized SON—In centralized SON (C-SON), function is more typically concentrated closer to higher-order network nodes or the network OSS, to allow a broader overview of more edge elements and coordination of e.g. load across a wide geographic area. Due to the need to inter-work with cells supplied by different equipment vendors, C-SON systems are more typically supplied by 3rd parties.

Hybrid SON—Hybrid SON is a mix of centralized and distributed SON, combining elements of each in a hybrid solution.

SON sub-functions—Self-organizing network functionalities are commonly divided into three major sub-functional groups, each containing a wide range of decomposed use cases.

Self-configuration functions—Self-configuration strives towards the "plug-and-play" paradigm in the way that new base stations shall automatically be configured and integrated into the network. This means both connectivity establishment, and download of configuration parameters are software. Self-configuration is typically supplied as part of the software delivery with each radio cell by equipment vendors. When a new base station is introduced into the network and powered on, it gets immediately recognized and registered by the network. The neighboring base stations then automatically adjust their technical parameters (such as emission power, antenna tilt, etc.) in order to provide the required coverage and capacity, and, in the same time, avoid the interference.

Every base station contains hundreds of configuration parameters that control various aspects of the cell site. Each of these can be altered to change network behavior, based on observations of both the base station itself and measurements at the mobile station or handset. One of the first SON features establishes neighbor relations automatically (ANR) while others optimize random access parameters or mobility robustness in terms of handover oscillations. A very illustrative use case is the automatic switch-off of a percent of base stations during the night hours. The neighboring base station would then re-configure their parameters in order to keep the entire area covered by the signal. In case of a sudden growth in connectivity demand for any reason, the "sleeping" base stations "wake up" almost instantaneously. This mechanism leads to significant energy savings for operators.

Self-healing functions—When some nodes in the network become inoperative, self-healing mechanisms aim at reducing the impacts from the failure, for example by adjusting parameters and algorithms in adjacent cells so that other nodes can support the users that were supported by the failing node. In legacy networks, the failing base stations are at times hard to identify and a significant amount of time and resources is required to fix it. This function of SON permits to spot such a failing base stations immediately in order to take further measures, and ensure no or insignificant degradation of service for the users.

Functions, operations, components and/or features described herein with reference to one or more embodiments, may be combined with, or may be utilized in combination with, one or more other functions, operations, components and/or features described herein with reference to one or more other embodiments, or vice versa.

Figure 1A:
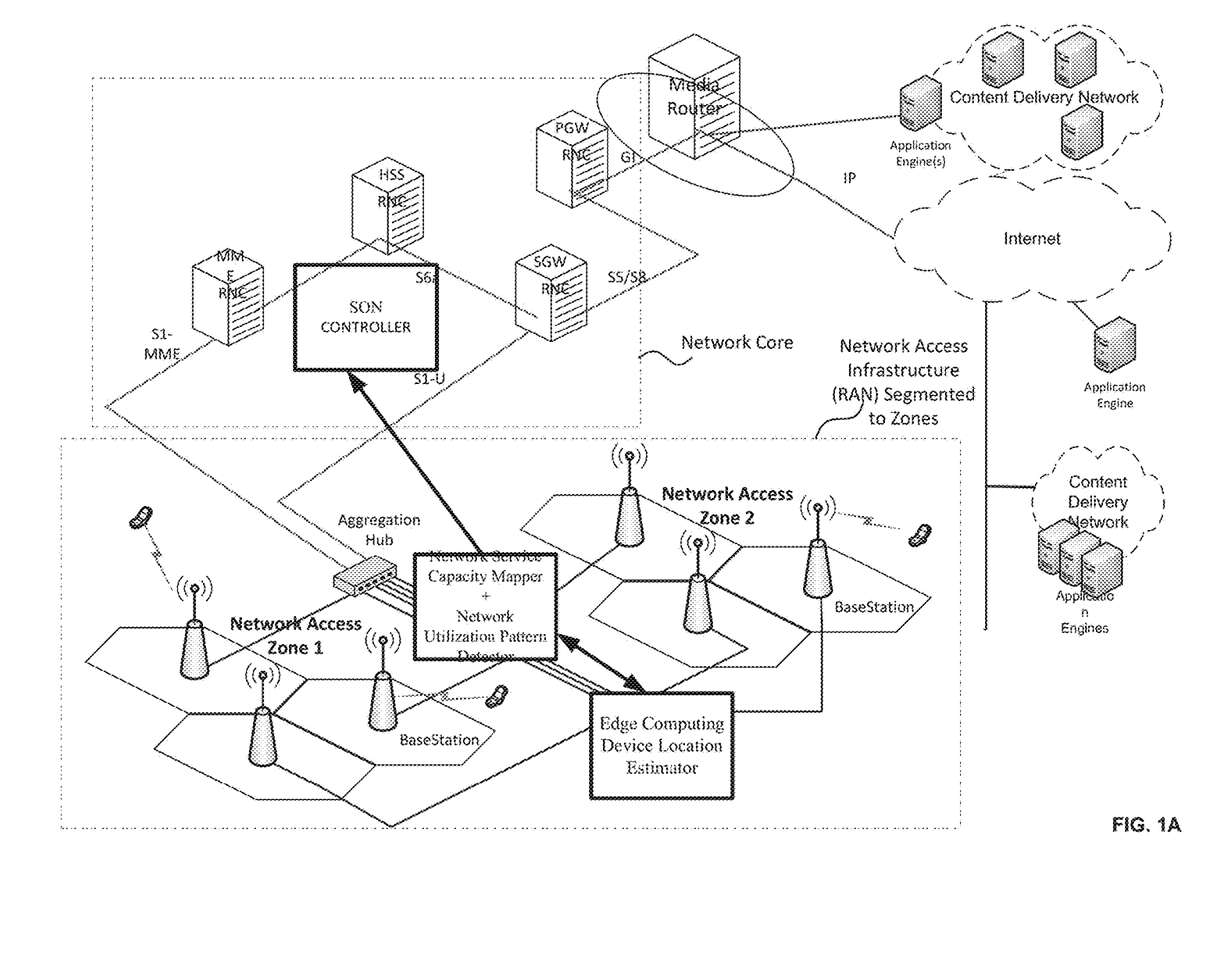
FIG. 1A is a network level diagram illustrating an exemplary wireless communication network in accordance with embodiments of the present invention include a network service capacity mapper.
Figure 1B:
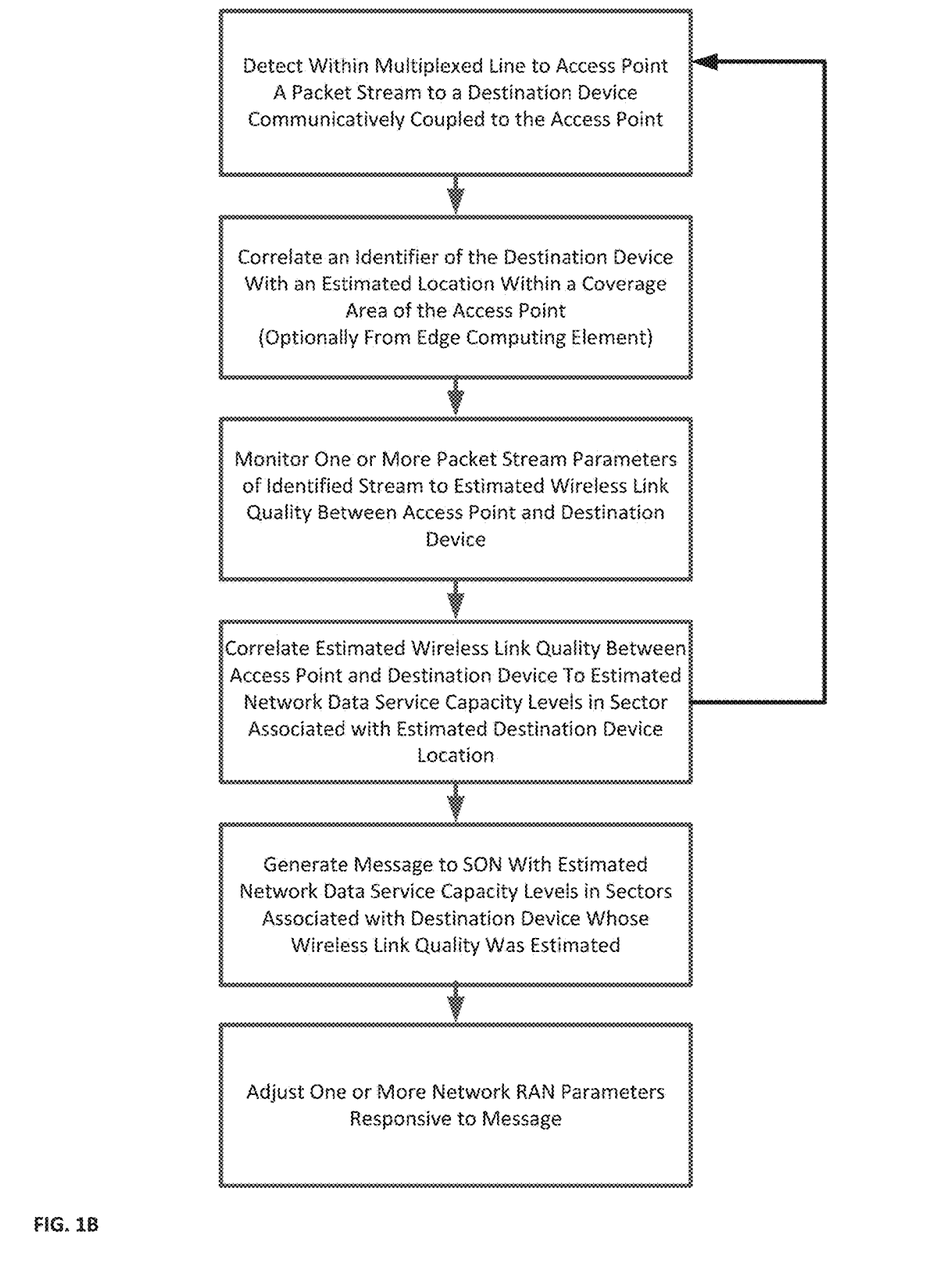
FIG. 1B is a flow chart including the steps of an exemplary method according to embodiments of the present invention to operate wireless communication network according.

Turning now to FIG. 1A, there is shown a network level diagram illustrating an exemplary wireless communication network in accordance with embodiments of the present invention include a network service capacity mapper. The operation of this network can be understood from the FIG. 1A alone or in combination with the steps shown in FIG. 1B, which is a flow chart including the steps of an exemplary method according to embodiments of the present invention to operate wireless communication network according. The network service mapper operates to gain insights into network capacity across different RAN coverage area sectors by inspecting packet stream to wireless devices estimated to be located in different network coverage area sectors.

Figure 2A:
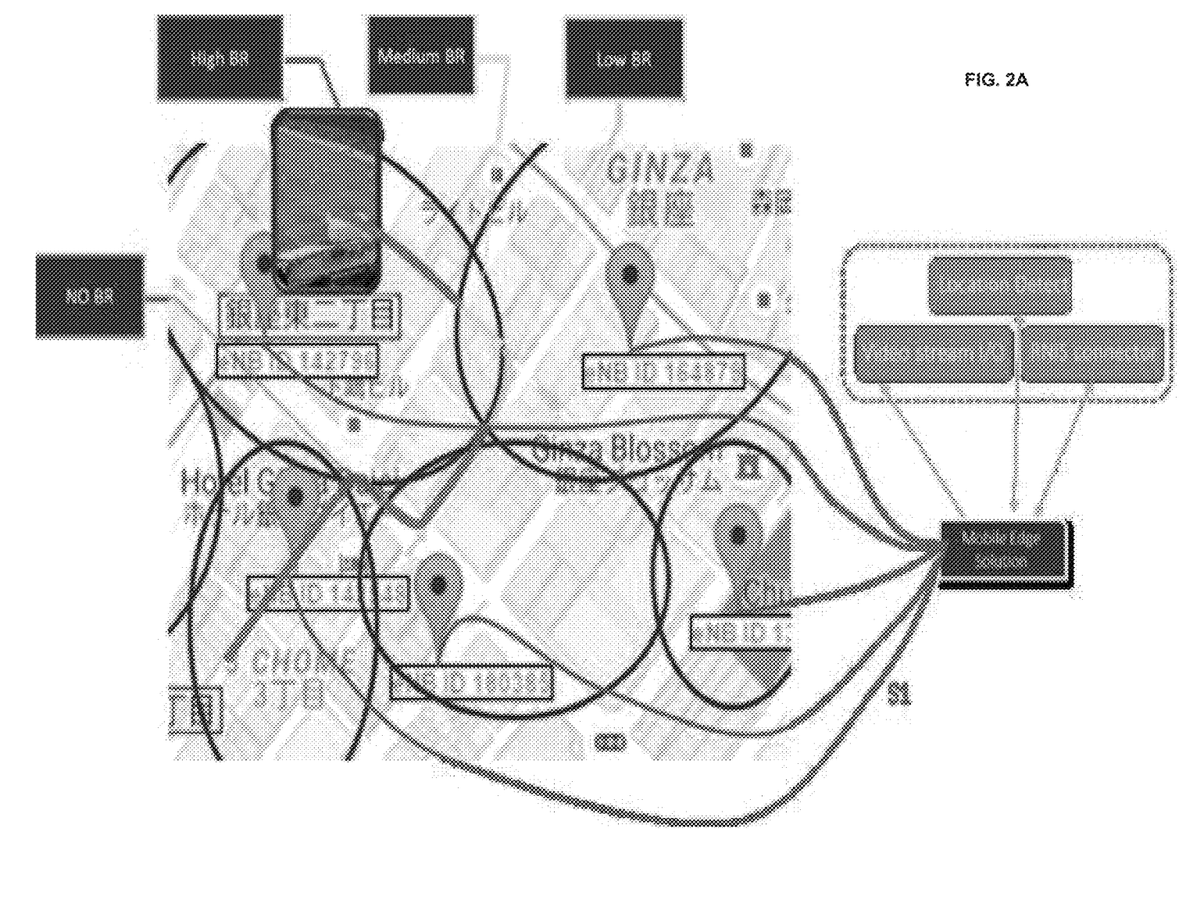
FIG. 2A is a data flow diagram indicating data exchanged between network elements end mobile communication devices in accordance with specific embodiments of the present invention.

Turning now to FIG. 2A, there is shown a data flow diagram indicating data exchanged between network elements end mobile communication devices in accordance with specific embodiments of the present invention. FIG. 2A further shows a capability to extract the radio and cell information and the user location at the edge of the network in an ongoing and automated manner which enables generating automated information gathering of quality of the network in each cell coverage area or sector, and at the borders between cells. The collected information is used to optimize the network configurations and thus the network behavior continually and automatically.

Figure 2B:
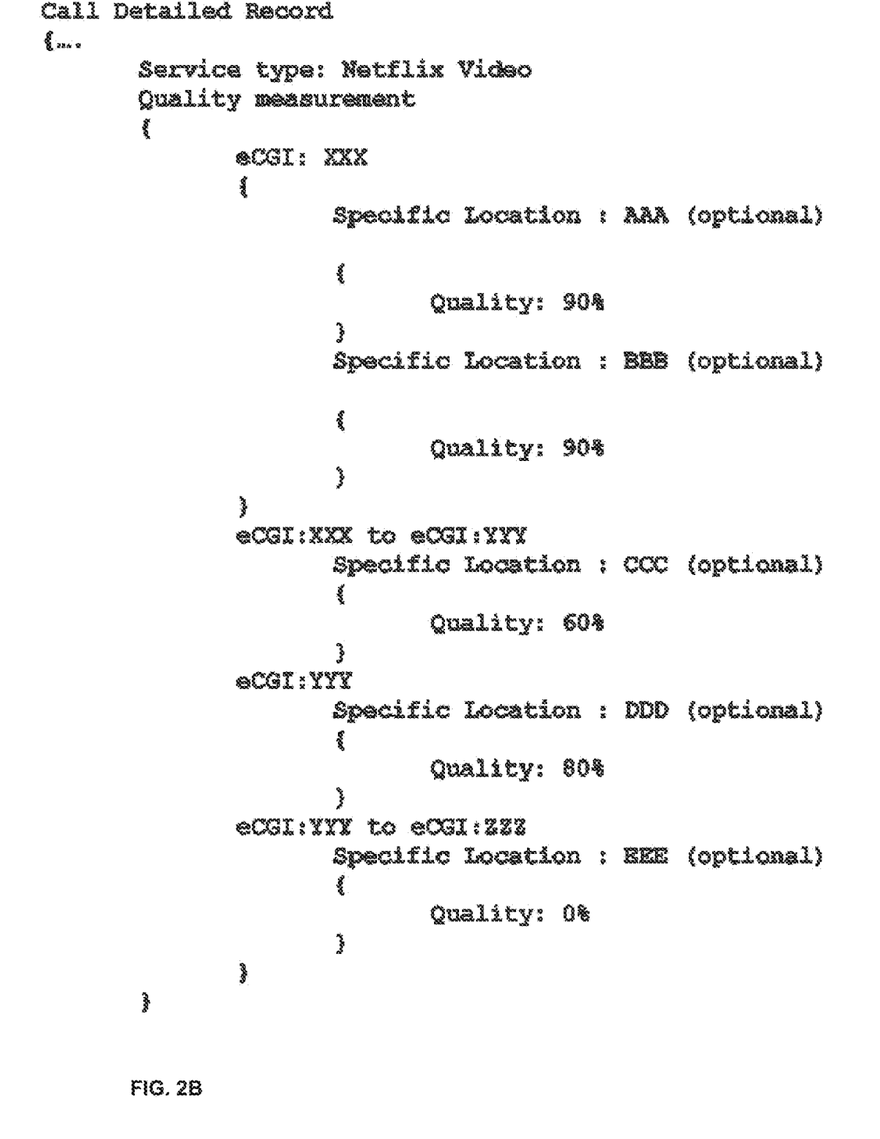
FIG. 2B is a sample of exemplary link quality report for a mobile communication device traveling across coverage area sectors during link quality measurement in accordance with embodiments of the present invention.
Figure 2C:
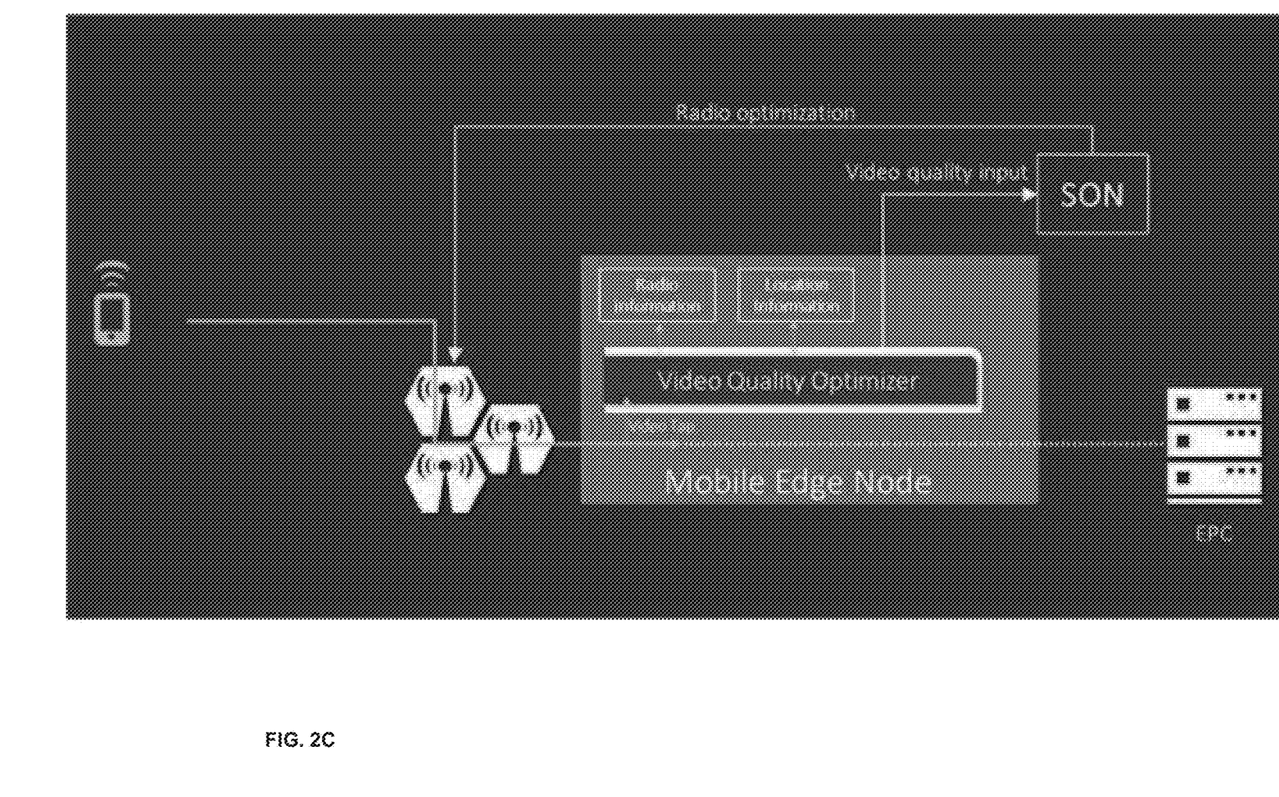
FIG. 2C is a simplified network diagram of an exemplary wireless communication network in accordance with specific embodiments of the present invention where the packet streams whose parameters are measured are multimedia or video packet streams and the SOR performs RAN radio optimization in response to detection of sectors with low service levels.

FIGS. 2A through 2C illustrate a systems and methods to enable generating information (CDRs or other) mapping the quality of the networks throughout each cell coverage area and on the boarders between cells, in an automated manner. The existence of edge computing solutions deep in the RAN portion of a mobile network enables the extracting of rich information that had not been available in the past. This includes a wide variety of parameters and data around the radio link conditions and cell congestion, and information regarding the location of each specific device. This information may be used to generate a mapping of the network quality in each specific cell coverage area/sectors and on the borders between the different cells.

Buy taping the long video sessions of actual devices connected and moving in the network, analyzing the quality of the video compared to expected quality, while possibly detecting the accurate location of the device and the cell-id of the cell it is connected to, continually and automatically, relevant quality information may be generated to be fed to SON systems or any other relevant system in the network that may use this information to ensure better configurations and performance of the network.

FIG. 2B is a sample of exemplary link quality report for a mobile communication device traveling across coverage area sectors during link quality measurement in accordance with embodiments of the present invention; and FIG. 2C is a simplified network diagram of an exemplary wireless communication network in accordance with specific embodiments of the present invention where the packet streams whose parameters are measured are multimedia or video packet streams and the SON performs RAN radio optimization in response to detection of sectors with low service levels.

FIG. 2C shows that a mobile edge node may be located in the RAN. A suggested video quality optimizer may be running on this node. It may tap some or all video calls and continuously receive radio/cell information and location information relevant to each device. Relevant quality data may be generated, by correlating video quality, location, cell-id and radio conditions, for many devices moving within the network, in an automated and continual manner. This information may be fed into a SON solution or controller, or any other element managing network/radio configurations, and may be used by these elements to setup the network/radio in a way that may dramatically improve the quality of the network.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A wireless communication network comprising:
   at least one network radio access network (RAN) segment with at least one wireless access points configured to provide a data connectivity service to at least one mobile communication device located within a coverage area of the at least one RAN;
   a Network Service Capacity Mapper ("NSCM") to estimate data service capacity levels providable by one or more access points of said at least one RAN within different sectors of the coverage area of the at least one RAN, wherein estimating data service capacity levels providable within a specific sector includes estimating one or more communication link parameters of an active, or recently active, wireless communication link between an access point of said RAN and a mobile communication device whose estimated location is within the specific sector, and wherein estimating one or more communication link parameters of a wireless communication link includes monitoring one or more packet streams transported over the wireless communication link;
   a Self-Organizing Network (SON) controller to receive from said NSCM regular update messages, relating to data service capacity levels estimated by said NSCM, and to adjust one or more RAN operational parameters so as to adjust data service capacity levels in sectors of said RAN coverage area;
   wherein said NSCM is adapted to concurrently estimate communication link parameters of each of two or more active, or recently active, wireless communication links, each wireless communication link being associated with a different mobile communication device located in the same or in different sectors of the coverage area, and each mobile communication device communicating with either the same or with a different access point of said RAN; and
   wherein estimating one or more link parameters of an active, or recently active, wireless communication link between an access point and a mobile communication device, in order to estimate a data service capacity level providable to a sector within which the mobile communication device is located, includes identifying within a multiplexed downstream communication line, leading to a transmit (TX) input port of said access point, a multimedia packet stream addressed to the mobile communication device.

2. The network according to claim 1, wherein estimating one or more link parameters of an active, or recently active, wireless communication link between an access point and a mobile communication device, in order to estimate a data service capacity level providable to a sector within which the mobile communication device is located, includes (a) correlating a packet destination device identified within the identified packet stream with an estimated location of the destination device within the coverage area of the RAN; and (b) estimating at least one wireless communication link parameter by measuring at least one parameter of the identified packet stream.

3. The network according to claim 2, wherein said NSCM uses one or more measured packet stream parameters of packet streams corresponding to each of one or more active, or recently, wireless communication links for wireless communication devices estimated to be located within a given sector of the coverage area for estimating a data service capacity level providable by said RAN to the given sector.

4. The network according to claim 1, wherein said NSCM estimation of one or more parameters of an active, or recently active, wireless communication link includes measuring a bitrate of a multimedia packet stream transported to the mobile communication device over the wireless communication link.

5. The network according to claim 4, wherein said NSCM estimation of one or more parameters of an active, or recently active, wireless communication link includes measuring a packet parameter of a multimedia packet stream transported to the mobile communication device over the wireless communication link, wherein the measured packet parameter is selected from the group consisting of: (a) uplink bitrate, (b) downlink packet jitter, (c) uplink packet jitter, (d) downlink packet latency, (e) uplink packet latency, and (f) ping packet round trip time.

6. The network according to claim 1, wherein said NSCM generates a reporting message to said SON controller with estimates of a RAN providable data service capacity levels to one or more sectors either on a fixed schedule, responsive to specific estimate trigger, or based on some combination of a schedule and triggers.

7. The network according to claim 6, wherein said reporting message includes estimates of providable data service capacity levels for each of one or more specific sectors of the coverage area where recent capacity estimates were made, or the reporting message may include the most recent capacity estates for all the sectors within the coverage area.

8. The network according to claim 6, wherein said SON controller is adapted to adjust one or more RAN operational parameters selected from the group of parameters consisting of: (a) reallocated a communication channel for one or more mobile communication devices located in a sector of the RAN coverage area; (b) reassign an access point for each one or more mobile communication devices in a sector of the RAN coverage area; (c) adjust a center frequency of one or more communication channels of an access point; (d) adjust a transmit power level of one or more TX communication channels of an access point; (d) adjust an RX amplifier gain of one or more RX communication channels of an access point; (e) adjust a beam-steering parameter for one or more channels, RX or TX, of an access point.

9. The network according to claim 1, wherein a coverage area sector is estimated to have a data service capacity level below a threshold level due to either passive or active radio frequency interference, and said SON either adjusts center frequencies, power level, gain factor or beamforming parameters associated with one or more communication channels servicing the sector.

10. The network according to claim 9, wherein passive interference may be introduced by non-radiating elements such as humidity, cars, trucks and buildings, while active interference may be radiating elements such as electrical generators, electric motors, RF communication transmitters and other access points.

11. The network according to claim 9, wherein when said SON receives a message indicating that a coverage area sector is estimated to have overcapacity relative to the number of mobile communications devices regularly present in that sector, the SON is configured to reallocate underutilized communication resources from servicing the sector with overcapacity towards servicing other sectors needing additional communication resources.

12. The network according to claim 11, further comprising a network utilization pattern detector functionally associated with said NSCM, and adapted to recognize cyclical network demand and capacity patterns across cyclical periods such as hours of the day, days of week, weeks of year, months of the year, and holidays.

13. The network according to claim 12, wherein said network utilization pattern detector is also functionally associated with said SON and is adapted to trigger said SON to predicatively adjust one or more network RAN parameters to correspond and compensate for demand and capacity predications based on previously identified demand and capacity patterns.

* * * * *